Patented Dec. 24, 1940

2,226,517

UNITED STATES PATENT OFFICE 2,226,517

PRODUCTION OF RUBBER OR RUBBERLIKE MASSES FROM LATEX

William Binns, Bradford, England

No Drawing. Application November 2, 1937, Serial No. 172,460. In Great Britain April 6, 1936

12 Claims. (Cl. 260—723)

This invention relates to improvements in the production of rubber or rubberlike masses from latex.

One object of the invention is to produce a stable coagulable mix which is or can be readily brought into a desired foamy or creamy mass and which can be satisfactorily applied to pile fabrics, rugs, textile fabrics or paper, or which can be used to cover yarn, thread or rope or the like, whereby a backing, coating or covering of rubber or the like is produced, after coagulation and vulcanisation, which has the sponge, porous or microporous characteristics to the desired degree, and which is tough and adherent and has good ageing properties.

The invention is not limited to such applications of the coagulable mix for it may also, for example, be extruded into filaments, or moulded in suitable moulds, e. g. porous moulds, or it may be extruded or run out upon surfaces, or materials or articles to be coated and/or impregnated may be dipped into it.

In relation to the application of the coagulable foam or cream as a backing or covering to textiles or like materials, a difficulty which is overcome by the invention is the shrinking which is liable to occur on coagulation. It is an advantage of the present invention that a mass can be produced which does not shrink on coagulation.

Another object is to produce a microporous rubber or rubberlike mass which is very suitable as a cement for combining fabrics, and is particularly suitable as an interlayer between the plies of textile fabric employed in producing shirt collars, so as to produce a semi-stiff collar, of which the stiffness is substantially unaffected by ironing, washing and other treatments to which the collars are usually put.

A further object is an improved method of concentrating latex to substantially complete dryness, the rubber or rubberlike material not being coagulated but being capable of reversion to a dispersion analogous to the original dispersion. This process is advantageous for use on or near the plantation for producing a transportable product consisting of almost pure rubber yet in a condition to be redispersed or to be readily disintegrated into particles.

According to the invention in the production of rubber or rubberlike masses from latex, the treatment of the latex comprises the incorporation of a polymerised aldehyde whereby the rubber may be segregated from the serum and the latter substantially wholly removed before coagulation of the rubber is effected.

Preferably an unpolymerised aldehyde, except formaldehyde, is also incorporated.

The polymerised aldehyde, or the polymerised aldehyde together with the unpolymerised aldehyde, may be produced by reagents such as an alcohol and an organic acid by mutual oxidation reduction process, the products of the reaction being incorporated in the latex, conditions being employed which are unfavourable to esterification.

Paraldehyde and metaldehyde are examples of suitable polymerised aldehydes; acetaldehyde and propionaldehyde of unpolymerised aldehydes; whilst the most suitable reagents are ethylene glycol and glacial acetic acid. The action of the polymerised aldehydes on the dispersion is one which modifies the water swollen albuminous layers surrounding the rubber particles, so that without changing the negative charge of the particles, the affinity of these layers to water is considerably reduced. There is thus produced a mass in which the rubber particles have a reduced affinity to water and also a reduced attraction toward one another. In effect the agent reacts with the albuminous layers to cause a split between the rubber particles on the one hand and the protein and serum on the other. Although the rubber particles remain in suspension, their affinity to water is comparable with any ordinary colloidal suspension possessing the Brownian movement, namely if the suspension were filtered the water would drop out leaving the rubber substantially free from water.

When heat is applied the water or serum falls away from the rubber and is evaporated, leaving a substantially anhydrous reticular mass of segregated rubber, the stabilisation of the dispersion having been such that coagulation proper has not then taken place. An after-treatment, for example a continuance of the heat treatment, if necessary with a raising of the temperature, will then bring about the coagulation. Such coagulation may, however, be produced by other means.

In the process according to the invention the effect of the change in the rubber latex or aqueous rubber dispersion is not easily apparent, but a definite physical effect is shown to exist. A thickening of the dispersion ensues and the whole becomes more viscous or creamy. The ability to foam or occlude air is very apparent, even where a considerable amount of albuminoid has been removed, such as in pure concentrated 60% centrifuged latex. Even when anti-foaming agents are added, as is desirable when forming microporous or solid rubber or rubberlike masses, the propensity to foam still exists. When air has been occluded and the aqueous rubber dispersions have been suitable stabilised, the falling away of the water is so apparent that on heating the water is precipitated or dropped out, leaving a porous substantially anhydrous reticular structure which is not coagulated even when vulcanisation has taken place, but will revert to a dispersion when placed into water. After segregation the mass may be coagulated by prolonging the heating, by increasing the temperature, by the action of light, by a sufficiently long time interval, say of 100 hours, or by the action of acids or acid fumes. Agents may be added to the mix which facilitate coagulation of the mass after a substantially anhydrous condition is reached. Where no air has been occluded and an anti-foaming agent added, a microporous reticular structure may be produced after heat has been applied and the water evaporated off, and on coagulation the whole shrinks to produce a solid coagulated mass of rubber.

If before coagulation has taken place, the microporous reticular mass is passed in the presence of steam through scribbling rollers the mass is broken down into rubber particles. So long as these particles remain damp or contain paraldehyde they will not bond together, but by compressing them in moulds and allowing them to age and dry out, the particles repolymerise and become bonded together as in coagulation.

It is found that the less albuminoid there is present in the latex, the less is the propensity to segregation, and in concentrated centrifuged latex it may be necessary to add additional albuminoid or albumen, such as egg albumen. Further, to render a concentrated latex suitable for treatment according to the invention, any propensity to coagulate readily by the action of heat or by the evaporation of a volatile alkali may be overcome by the addition of protective colloids or dispersing agents, otherwise coagulation may take place before segregation with the result that the water or serum would be locked in the reticular rubber mass produced. When more albumen, such as egg albumen, is added to a rubber dispersion, and treated with a water soluble polymerised aldehyde, segregation becomes so apparent that, on standing over a long interval of time, the water becomes visibly separated but can be stirred in again without impairing the properties of the dispersion.

The invention will now be described in more detail with reference to the production of sponge or porous rubber, particularly suitable as backings for rugs, carpets and other fabrics. The latex employed is preferaly a stabilised and concentrated latex of the kind which is known under the registered trade-mark "Revertex."

Preferably vulcanization ingredients are present with the latex so that coagulation and vulcanisation can be concurrently effected by the application of sufficient heat or a prevulcanized latex may be used.

It is desirable, in order to improve the stabilising effect on the latex dispersion when whipped to a foam or otherwise, to add an alkali and also ammonia, and furthermore a trace of rubidium carbonate or caesium carbonate, which salts have a catalytic action.

The invention is illustrated by the following examples:

Example 1

5 parts by weight of paraldehyde in 20 parts by weight of water are shaken together and a proportion of ammonia to obtain a pH value of 9 is added. This preparation when added to "Revertex" has the desired effect of readily producing a foam on stirring and no effervescence occurs. When heated the water is evaporated leaving a segregated rubber or rubberlike mass in a substantially anhydrous condition, which mass is coagulated by continued application of heat or by other means. The proportion of the addition can vary according to the degree of porosity or sponginess required, between, say, .1% to 5% by weight of paraldehyde based on the dry rubber content of the "Revertex." Such a preparation is only stable for a short time and consequently the preparation must be freshly produced and used without delay. A remarkable degree of stability may be ensured by the addition of acetaldehyde.

Example 2

Long period high volume sponge can be obtained by adding from .05% to 2% of the following solutions into a Revertex mix.

5 parts of paraldehyde,
1 part of acetaldehyde,
20 parts of water with ammonia or KOH to bring the solution to 9 pH.

The addition of water is optional but preferable. The mass is stirred and heated as described in Example 1.

Example 3

High volume sponge can also be obtained by adding from .05% to 2% of the following solutions to the Revertex, the proportions being based on the dry rubber content of the Revertex.

5 parts of paraldehyde,
5 parts of acetaldehyde,
20 parts of water with ammonia or KOH to bring the solution to 9 pH.

The percentage of aldehydes to polymerised aldehydes may vary considerably to produce the sponge coagulant effect.

There may with advantage be incorporated in the preparations a bare trace—e. g. from 1/500,000 to 1/1,000,000 parts by weight—of rubidium carbonate or caesium carbonate. The mass is stirred and heated as described in Example 1.

Example 4

A solution is made up as follows:

124 parts by weight of ethylene glycol,
60 parts by weight of glacial acetic acid, and
700 parts by weight of distilled water.

These ingredients are mixed together at a temperature not higher than 10° C. in order to prevent esterification, i. e. formation of ethylene diacetate, and this solution is kept in the light for three days. At the end of this period there is added to the solution:

4 parts by weight of potassium hydroxide in 15 parts by weight of water.

There is concurrently prepared a solution of 50 parts by weight of ammonia (.88) in
130 parts by weight of water, and this is added, while stirring slowly and keeping the temperature no higher than 12° C., to the previously described solution.

The object of the addition of the ammonia is to produce a pH value of approximately 9.0.

The preparation is now left for two days and there is added .0001 part by weight of rubidium carbonate or caesium carbonate in one part by weight of water, and then the preparation is allowed to stand for a further two days. At the end of this time there is added one part by weight of methyl alcohol. The preparation is then ready to be incorporated in any suitable vulcanisable dispersion of rubber such as "Revertex." The proportion of the preparation to be added to the rubber dispersion is from 1 to 3% based on the dry rubber content. The rubber dispersion so treated is stirred or whipped to a cream or foam to a degree according to the porosity or sponginess required. It may be mentioned that without whipping or incorporation of gas or other device calculated to expand the volume of the mass, the rubber will possess when coagulated a microporous structure.

In practice it is not necessary in any of the examples to add for any purpose effervescing substances but electrolytic foaming methods may be resorted to in order to save time in bringing the latex preparation to the desired consistency. A suitable electrolytic foaming method consists in arranging two or more electrodes to revolve in a latex mix, exciting these electrodes with an alternating electric current so that a circuit is completed through the rubber mix, the electrical energy being polarized, scattered in the mix and at the same time liberating bubbles of hydrogen and oxygen (by electrolysis) resulting in an expansion by volume producing the foaming. The frequency may be from 50 to 100 cycles per second and the voltage and current will vary according to the conduction of the mix, the size and distance apart of the electrodes being such as not to increase the temperature of the mix to more than 60° C. but sufficient to produce effervescence without causing channels, short circuiting, arcing at the electrodes or sparking in the mix.

The mass is then heated preferably starting at a temperature below the temperature of boiling water and increasing the temperature to or above the boiling point of water. As a result of the heating the water is evaporated and a reticular structure of substantially anhydrous rubber is obtained and this coagulates on continuation of heating.

*Example 5*

1500 parts "Revertex" of a 75% solid content,
30 parts sulphur,
70 parts zinc oxide,
1.25 parts di-beta-naphthyl-p-phenylenediamine,
10 parts peperidine pentamethylene dithiocarbamate
1 part zinc-diethyldithiocarbamate,
60 parts of 60% English lithopone.

The above powders are dispersed 170 parts of water to which has previously been added .5 part of a dispersing agent. The dispersion is then added to the "Revertex" with 6 parts of an 8% solution of paraldehyde and water containing a trace of rubidium carbonate and the whole vigorously stirred into a foam. Stirring is continued until the volume has expanded to the required degree, and the viscosity is approximately that of whipped cream. The mix is then applied by knife spreading or roller methods on to a rug held taut in a frame with sidewalls, forming a tray, which determine the thickness of the spread. The fabric, with its coating of frothy rubber mix, is then put into a dry hot air oven where it is subjected to a temperature of 100° C. to 120° C. for 40 minutes whereby the rubber is segregated and vulcanised. During the heating there is a considerable evolution of air and vapour which does not materially affect the sponge structure. The rug is removed from the oven and stripped from the frame, after which the edges are turned back on to the coating and cemented down and the rug subjected to a temperature of 120° C. for 20 minutes radiant heat. After ageing for 48 hours the sponge backing is then coagulated, and is not reversible in water. Additional loading with whiting and emulsified mineral oil may be resorted to for cheapening and weighting the sponge structure.

It is found that the composition adheres thoroughly to the fabric and that it has not been found detrimental even to most delicate dyes.

Instead of 6 parts of an 8% solution of paraldehyde and water, there may be used with the above mix 7 parts of a solution of water to which has been added 5 parts of paraldehyde and 2 parts of acetaldehyde. The mix may alternatively be foamed by injecting it into a cylinder which possesses a double piston, the heads of which are perforated and contain in the perforations a curled structure of fine wire or animal hair. Movement of one piston away from the other draws the mix through the perforations in this other piston into the space between the two pistons, and then a movement of either towards the other expels the mix through the perforations in the first piston as a creamy air-occluded mix.

Another method of producing the foam is by the addition to the mix of carbon dioxide snow which causes effervescence to take place and on stirring the mass readily foams.

When a gelling agent is added along with divalent or trivalent ions and paraldehyde is incorporated, the gel stage is modified so that the molecules of the rubber are held at a more fixed interpolate stage, due to the paraldehyde modification. Such a structure, after setting at a temperature above boiling water, will retain its original size without shrinkage until substantially all the water has been removed, after which a shrinkage occurs. If the latex mix be viscous without occluded air, the finished structure would be microporous. If the latex be exceedingly fluid and contains substantial antifoaming agents, the mass will be microporous after evaporation of the water in the act of segregation and will commence to shrink until it becomes solid.

Modification of microporosity can be obtained by making a coagulated mix possessing hollow spaces or cavities without microporosity. This is obtained by utilising the peculiar characteristic of carbon black to retain on its particles a volume of gas such as benzine vapour or the like, so as to suspend such on itself in a dispersion of water. When this carbon black dispersion is combined with a latex mix and the whole treated as before mentioned, after segregation and coagulation has taken place isolated cavities are left in the structure due to the evolution of gases during segregation.

*Example 6*

The following is a mix which may be employed for producing solid rubber.
500 parts of "Revertex T" (60% dry rubber content),
12 parts of zinc oxide,
3 parts of sulphur,
2 parts of agerite white,
3 parts of zinc salt of dibutyldithiocarbamic acid,
6 parts of lithopone,
280 parts whiting,
83 parts of china clay,
3 parts of carbon black.

All these powders are brought into a dispersion with 210 parts of water containing 12 parts of a dispersing agent, and the dispersion is then added to the "Revertex." After adding 2 parts of an 8% paraldehyde solution containing a trace of rubidium carbonate, the whole mix is stirred and subjected to vacuum so as to remove any occluded air. So that this mix will rapidly become set at temperatures above boiling water, 3 parts of ammonium sulphate and 13 parts of water are added as a solution. The mix can then be poured out into moulds and subjected to a temperature of 120° C. until a segregated state is attained, the rubber is then removed from the moulds and after ageing for 48 hours is vulcanised for 1 hour at 90° C. A progressive shrinkage then commences and the microporous structure diminishes until a solid rubber is formed.

Sponge reversible latex may be made on the plantation by utilising any of the known latex reversible processes and adding to the latex 1% of an 8% solution of paraldehyde in water containing 1% acetaldehyde, the mix being foamed, run into trays and the water evaporated out, whereafter the product can be rolled up into sheets for export purposes.

A suitable mix for producing a microporous structure suitable as a coating to form imitation pelts, suedes and the like is as follows:

Example 7

130 parts of "Revertex,"
7 parts of zinc oxide,
2 parts of sulphur,
.1 part of anti-ager,
1 part of tetraethylthiuram disulphide,
10 parts of titanium dioxide,
40 parts of starch,
60 parts of talc,
20 parts of emulsified mineral oil,
50 parts of aluminium silicate,
7 parts of egg albumen+.5 ethylene glycol,
.02 part of beryllium carbonate, Colouring matter as required.

A dispersion of the zinc oxide, sulphur, antiager, tetraethylthiurum disulphide and titanium dioxide in 18 parts of water is added to the Rivertex, and then a paste of the remaining ingredients is added and the whole mixed together, whereafter 3 parts of a solution, as in Example 3, are added. This mix is then ready to be applied to fabrics by roller or similar methods and heated to cause segregation and coagulation. A design may be embossed upon the mass before vulcanising at 120° C., for 20 minutes. So as to remove any rubber feel on the surface an aqueous solution of resin, opaque or transparent rubber varnish may be applied.

The following is an example of the process and mix suitable for use in combining fabrics—particularly for semi-stiff collars:

Example 8

130 parts of "Rivertex",
7 parts of zinc oxide,
2 parts of sulphur,
0.1 parts of tellurium,
0.1 part of di-beta-naphthyl-p-phenylenediamine.
1 part of tetraethylthiuram disulphide,
3 parts of titanium dioxide,
0.5 part of ultramarine blue.

These powders are ground in a pebble mill with 18 parts of water, plus .2 part Darvan, (wetting out agent) for 48 hours until a colloidal suspension is obtained. The dispersion is then added to the "Rivertex" and allowed to stand for 24 hours. After this is added:

0.5 part of ethylene glycol,
0.5 part of Lanoline,
0.5 part of a solution of 50 parts water, 3 parts paraldehyde, 0.5 part acetaldehyde, 0.002 rubidium carbonate.

To the above is added a solution of 16 parts egg albumen in 49 parts of water. The mix is then allowed to stand for a few hours. In using this mix the fabrics are treated and segregation caused to take place whilst the fabrics are separate and still in the piece. The fabric is then cut out to the desired pattern; the treated sides are placed together and the fabric pressed first with a cold iron and then placed in a hot press at about 100 lbs. to the square inch at 140° C. for a few seconds, after which it is vulcanized for 30 minutes at 120° C. This combined fabric does not stain, is exceedingly stiff, tough and the interlayer is microporous.

This mix is also suitable for belting and other purposes where the fabric is likely to be in contact with vegetable oils, as its resistance to such is very pronounced.

In order to protect the rubber against possible excess of fatty acid and therefore to ensure good ageing properties it is sometimes desirable to add a small quantity of di-β-naphthyl-p-phenylenediamine.

The spongy structure may be varied by adding ammonium salts but in general this is not necessary.

Various fillers and modifying additions may be made, for instance cellulose derivatives, e. g. benzyl cellulose may be incorporated. Oil may be added in order to produce a leather-like substance which has not any pronounced spongy characteristics but which is nevertheless microporous.

In order to reduce inflammability chlorinated naphthalene compounds may be added or alternatively aluminum silicate.

What I claim is:

1. Process for the production of rubber or rubberlike masses comprising the step of incorporating in the latex a polymerized aldehyde selected from the group consisting of paraldehyde and metaldehyde and an unpolymerised aldehyde, to reduce the affinity of the rubber particles for water selected from the group consisting of acetaldehyde and propionaldehyde.

2. Process for the production of rubber or rubberlike masses comprising the steps of incorporating in the latex paraldehyde and acetaldehyde to reduce the affinity of the rubber particles for water and heating the treated latex whereby the rubber is segregated from the serum and the latter substantially wholly removed before coagulation of the rubber is effected.

3. Process for the production of rubber or rubberlike masses comprising the step of incorporating in the latex paraldehyde and acetaldehyde to reduce the affinity of the rubber particles for water.

4. Process for the production of sponge rubber masses comprising incorporating in latex a polymerised aldehyde selected from the group consisting of paraldehyde and metaldehyde, stirring the mix into a foam, heating said foam to produce a segregated rubber mass in a substantially anhydrous condition and further heating the mass to coagulate it.

5. Process for the production of microporous rubber masses comprising incorporating in latex a polymerised aldehyde selected from the group consisting of paraldehyde and metaldehyde and an antifoaming agent, heating the mix above the evaporation point of water and then coagulating the resultant segregated rubber mass.

6. Process according to claim 5 including the incorporation with the other constituents of the mix of carbon black having a gas adsorbed thereon, the mass after segregation and coagulation having left therein isolated cavities due to the evolution of gas from the particles of carbon black during segregation.

7. Process according to claim 4 in which the latex is a centrifugally concentrated latex to which is added a material selected from a group consisting of albumen and albumenoids.

8. Process according to claim 5 in which the latex is a centrifugally concentrated latex to which is added a material selected from a group consisting of albumen and albumenoids.

9. Process for the production of a powdery rubber mass from latex comprising incorporating in latex a polymerised aldehyde selected from the group consisting of paraldehyde and metaldehyde and an antifoaming agent, heating the mix to produce a segregated rubber mass in a porous, substantially anhydrous and non-coagulated condition, and breaking down the mass into particles.

10. A substantially anhydrous vulcanized uncoagulated reticular mass of segregated rubber produced by vulcanizing the product resulting from the process of claim 2.

11. Process for the production of rubber or rubberlike masses comprising the steps of incorporating in the latex a polymerised aldehyde selected from the group consisting of paraldehyde and metaldehyde to reduce the affinity of the rubber particles for water and an unpolymerized aldehyde selected from the group consisting of acetaldehyde and propionaldehyde, and heating the treated latex whereby the rubber is segregated from the serum and the latter substantially wholly removed before coagulation of the rubber is effected.

12. Process for the production of rubber or rubberlike masses comprising the step of incorporating in the latex a polymerised aldehyde selected from the group consisting of paraldehyde and metaldehyde and a trace of a material selected from a group consisting of rubidium carbonate and caesium carbonate to reduce the affinity of the rubber particles for water.

WILLIAM BINNS.